(12) United States Patent
Fuchs et al.

(10) Patent No.: US 7,463,361 B2
(45) Date of Patent: Dec. 9, 2008

(54) OPTICAL APPARATUS HAVING A POLARIZATION SPLITTER AND MULTIPLE INTERFEROMETERS

(75) Inventors: Christopher A. Fuchs, Dublin (IE);
Michael Vasilyev, Plano, TX (US);
Bernard Yurke, Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/702,451

(22) Filed: Feb. 5, 2007

(65) Prior Publication Data
US 2007/0133005 A1    Jun. 14, 2007

Related U.S. Application Data

(62) Division of application No. 10/812,164, filed on Mar. 29, 2004, now Pat. No. 7,206,069.

(51) Int. Cl.
*G01B 9/02* (2006.01)
(52) U.S. Cl. ...................................... 356/491
(58) Field of Classification Search .......... 356/484–495
See application file for complete search history.

(56) References Cited

U.S. PATENT DOCUMENTS

| 4,306,809 | A |   | 12/1981 | Azzam ................ 356/368 |
| 4,418,981 | A | * | 12/1983 | Stowe ................. 356/477 |
| 4,681,450 | A |   | 7/1987  | Azzam ................ 356/367 |
| 4,725,145 | A |   | 2/1988  | Azzam ................ 356/367 |
| 4,798,468 | A |   | 1/1989  | Ohuchi ............... 356/351 |
| 5,282,188 | A |   | 1/1994  | Gage ................. 369/110 |
| 5,337,146 | A |   | 8/1994  | Azzam ................ 356/367 |
| 5,541,729 | A | * | 7/1996  | Takeuchi et al. ...... 356/494 |
| 5,663,793 | A |   | 9/1997  | de Groot ............. 356/351 |
| 5,719,702 | A |   | 2/1998  | Decker ............... 359/487 |
| 5,999,261 | A | * | 12/1999 | Pressesky et al. ..... 356/493 |
| 6,373,614 | B1 |  | 4/2002  | Miller ............... 359/237 |
| 6,687,008 | B1 | * | 2/2004 | Peale et al. ......... 356/477 |
| 2004/0095865 | A1 |   | 5/2004 | Katayama ............. 369/53.28 |
| 2005/0275846 | A1 | * | 12/2005 | Cheng ............... 356/450 |
| 2006/0146340 | A1 | * | 7/2006 | Szwaykowski et al. .. 356/495 |

FOREIGN PATENT DOCUMENTS

JP            06102009 A    *    4/1994

OTHER PUBLICATIONS

Saida et al, Integrated optical polarization analyzer on planer lightwave circuit, Electronics Letters, Oct. 1999, Vil. 35, No. 22, pp. 1848-1949.*

Saids et al, Integrated optical polarization analyser on planar lightwave circuit, Electronics Letters, vol. 35, No. 22, Oct. 1999, pp. 1948-1949.*

(Continued)

*Primary Examiner*—Samuel A Turner
(74) *Attorney, Agent, or Firm*—John F. McCabe

(57) ABSTRACT

A passive optical system substantially simultaneously separates light received at an optical input into three or more output light beams on optical outputs. The output light beams may have intensities that are proportional to intensities of optical projections of the received light onto three or more basis vectors of a tetrahedral basis set of a Stokes space. The system includes either multiple partial polarization splitters or multiple optical interferometers.

6 Claims, 4 Drawing Sheets

OTHER PUBLICATIONS

Ambirajan, et al., "*Optimum angles for a polarimeter: part I*," Optical Engineering, vol. 34, No. 6, pp. 1651-1655, Jun. 1995.

Ambirajan, et al., "*Optimum angles for a polarimeter: part II*," Optical Engineering, vol. 34, No. 6, pp. 1656-1658, Jun. 1995.

Clarke, R.B.M., et al., "*Experimental realization of optimal detection strategies for overcomplete states*," Physical Review A, vol. 64, pp. 012303-1 to 012303-13, May 31, 2001.

* cited by examiner

OPTICAL APPARATUS HAVING A POLARIZATION SPLITTER AND MULTIPLE INTERFEROMETERS

This is a divisional of application Ser. No. 10/812,164 filed on Mar. 29, 2004 now U.S. Pat. No. 7,206,069.

BACKGROUND OF THE INVENTION

1. Field of the Invention

This invention relates to devices for analyzing polarization dependent properties of light beams.

2. Discussion of the Related Art

A light beam is described by wavelength, amplitude, phase, and polarization. Conventional optical communication systems have used both amplitude and phase modulation of light beams as the basis of schemes for transmitting digital and analog information. The polarization of a light beam provides an additional property that could be modulated to carry analog or digital information.

For a modulated polarization to carry information, an optical communication system must have a receiver that is configured to measure a polarization-dependent property of the received light beam. Conventional optical analyzers for polarization-dependent properties have typically either used complex optical analyzers or operated in ways that reduce information capacities in polarized light beams. The complex optical analyzers have many optical components and are undesirable due to the high expense associated with their fabrication. Reducing the information capacity of a polarized light beams is also undesirable, because this result could destroy a major advantage that polarization modulation potentially provides in optical communication systems. For these reasons, conventional optical analyzers for polarization-dependent properties are undesirable in optical receivers that are configured to extract information from polarization-dependent properties of light.

SUMMARY

In one aspect, an apparatus includes a first partial polarization splitter, a second partial polarization splitter, and an ordinary polarization splitter. The first partial polarization splitter transmits light of one polarization to first and second optical outputs and transmits light of an orthogonal polarization substantially only to the second optical output. The second partial polarization splitter transmits light of one polarization to third and fourth optical outputs and transmits light of an orthogonal polarization component substantially only to the fourth optical output. The second partial polarization splitter has an optical input for receiving light from the second optical output. The ordinary polarization splitter transmits light of one polarization to a fifth optical output and transmits light of an orthogonal polarization to a sixth optical output. The ordinary polarization splitter has an optical input for receiving light from the fourth optical output.

In another aspect, an apparatus includes a polarization splitter, a first optical interferometer, and a second optical interferometer. The polarization splitter separates light into a first polarization component and an orthogonal second polarization component. The first optical interferometer is coupled to receive light of the first and second polarization components from the splitter at separate optical inputs and is configured to interfere part of the light of the first polarization component with part of the light of the second polarization component. The second optical interferometer is coupled to receive light of the first and second polarization components from the polarization splitter at separate optical inputs and is configured to interfere a portion of the light of the first polarization component with a portion of the light of the second polarization component. The second optical interferometer is configured to produce a different relative phase between interfering light of the two polarization components than the first optical interferometer.

Some embodiments feature an optical analyzer that is capable of substantially simultaneously measuring multiple polarization-dependent properties of received light. The optical analyzer includes a passive optical system that substantially simultaneously separates light received at an optical input into three or more output light beams on optical outputs. The output light beams may have intensities that are proportional to intensities of optical projections of the received light onto three or more basis vectors of a tetrahedral basis set of a Stokes space. The systems include either multiple partial polarization splitters or multiple optical interferometers.

BRIEF DESCRIPTION OF THE DRAWINGS

Herein, like reference numbers refer to functionally similar elements.

The illustrative embodiments are described more fully with reference to the accompanying figures and detailed description. The inventions may, however, be embodied in various forms and are not limited to embodiments described herein.

DETAILED DESCRIPTION OF ILLUSTRATIVE EMBODIMENTS

Various embodiments relate to passive optical analyzers that substantially simultaneously produce output light beams whose intensities are proportional to intensities of optical projections of a received light beam along basis vectors of a tetrahedral basis set of a Stokes vector space. These optical projections determine the magnitudes and relative phases of the polarization components in the received light beam. By performing optical projections onto a set of tetrahedral basis vectors, the new optical analyzers maintain simple designs and often still extract substantially the same amount of information as optical analyzers that are more complex.

To describe optical projections, it is convenient to represent the polarization components of a light beam with complex 2-dimensional vectors, i.e., vectors of the form $S=(x, y)^t$. Here, x and y Cartesian coordinates of the vector S and may be complex. Here, the superscript "t" refers to the transpose operation. The x and y components of the complex vector S correspond to the orthogonal linear polarization states of the beam's electric field. The amplitude and phase of the x and y components represent the amplitude and phase of the associated polarization components of the electric field.

In this representation, a tetrahedral basis of a Stokes vector space includes a set of four complex 2-component vectors that forms an over complete basis set. Herein, a set of tetrahedral basis vectors of a Stokes vector space will be referred to as $u_1$, $u_2$, $u_3$, and $u_4$. The basis vectors $u_1$, $u_2$, $u_3$, and $u_4$ are referred to as a tetrahedral basis set, because their projections onto each other are of equal absolute value. In particular, if the basis vectors are normalized such that $u_i^\dagger \cdot u_i = 1$ for i=1-4, then, the various projections, $u_i^\dagger \cdot u_j$, have the same magnitude for all pairs (i, j) such that j≠i. Here, the superscript "†" refers to Hermitian conjugation. An exemplary normalized tetrahedral basis set is given by: $u_1 = (1, 0)^t$, $u_2 = (1, \sqrt{2})^t/\sqrt{3}$, $u_3 = (1, \sqrt{2}e^{i2\pi/3})^t/\sqrt{3}$, and $u_4 = (1, \sqrt{2}e^{-i2\pi/3})^t/\sqrt{3}$. For this exemplary set, the projection of an arbitrary vector along $u_1$, $u_2$, and along either $u_3$ or $u_4$ will determine the magnitude of the polarization components of the electric field and the relative phase between said components.

Figure 1:
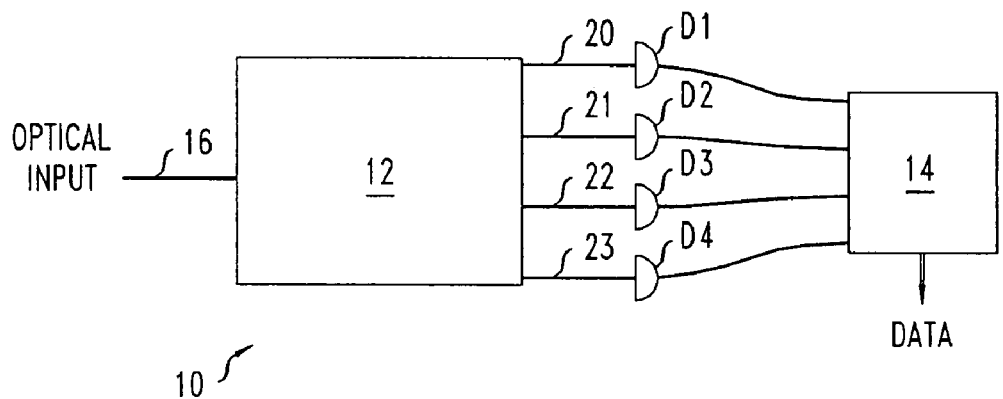
FIG. 1 shows an optical detector having an optical analyzer that projects a received light onto basis vectors of a tetrahedral basis set of a Stokes space.

FIG. 1 shows an optical detector 10 that substantially simultaneously measures optical projections of received light of a preselected wavelength along the basis vectors of a tetrahedral basis set of a Stokes space. The optical detector 10 includes optical projector 12; light intensity detectors D1, D2, D3, and D4, e.g., photomultiplier tubes or photodiodes; and an electronic data processor 14. The optical projector 12 is a passive optical device that receives light of a light beam input at optical input 16 and separates the received light into output light beams that are transmitted to three or four optical outputs 20, 21, 22, 23.

At optical outputs 20, 21, 22, and 23, the intensities of light of the preselected wavelength are proportional to light intensities of optical projections of the light received at optical input 16 along respective tetrahedral vectors, $u_1$, $u_2$, $u_3$, and $u_4$. In particular, if S represents the light received at optical input 16, the light intensity detectors D1, D2, D3, and D4 will receive from optical projector 12 polarized light whose intensities are proportional to those of the respective optical projections $u_1^{554} \cdot S$, $u_2^{554} \cdot S$, $u_3^{554} \cdot S$, and $u_4^{554} \cdot S$. The light intensity detectors D1, D2, D3, and D4 measure intensities of these optical projections of the received light along the respective basis vectors $u_1$, $u_2$, $u_3$, and $u_4$. The light intensity detectors D1, D2, D3, and D4 transmit to electronic data processor 14 electrical signals that represent the respective light intensities measured therein.

From the measured intensities, the processor 14 determines amplitude, phase, and polarization information about the light received at optical input 16, i.e., DATA in FIG. 1. Exemplary information includes magnitudes of the light's polarization components and the relative phase between the light's polarization components. Some exemplary embodiments of optical detectors 10 have only three light intensity detectors D1, D2, and D3, e.g., to measure intensities of optical projections onto $u_1 = (1, 0)^t$, $u_2 = (1, \sqrt{2})^t/\sqrt{3}$ and $u_3 = (1, \sqrt{2}e^{i2\pi/3})^t/\sqrt{3}$. Such embodiments are also able to provide amplitudes and relative phases on the two polarization components for the light received at optical input 16. Other embodiments having four detectors D1, D2, D3, and D3 may however, have an advantage in terms of information capacity.

In circumstances where one has no prior knowledge of the direction of the polarization of a N-photon packet of light, the mutual information, M, for a detector having k photo-detectors is calculated from quantities p(n) and p(n|Π). The quantity $p(n) = \int p(n|\Pi) d\Omega_\Pi$ where $\int d\Omega_{529}$ is a uniform integration over the Poincaré sphere. The quantity p(n|Π) is defined from a set probabilities {p(i|Π)} where p(i|Π) is the probability that a photon of polarization state Π will arrive at detector "i". For an N photon state, the probability p(n|Π) of $n_1, n_2, \ldots n_k$ photons arriving at respective detectors 1, 2, ..., k in polarization state Π is given by:

$$p(n|\Pi) = \frac{N!}{n_1! n_2! \ldots n_k!} p(1|\Pi)^{n_1} p(2|\Pi)^{n_2} \ldots p(k|\Pi)^{n_k}.$$

Here, $n = (n_1, n_2, \ldots n_k)$ is a k-dimensional vector whose components are the number of photons arriving corresponding detectors, e.g., $n_i$ is the number of photons arriving at detector "i". In terms of p(n|Π) and p(n), the mutual information, M, is given by:

$$M = -\Sigma_n p(n) \log[p(n)] + \int [\Sigma_n p(n|\Pi) \log[p(n|\Pi)]] d\Omega_\Pi$$

Figure 3:
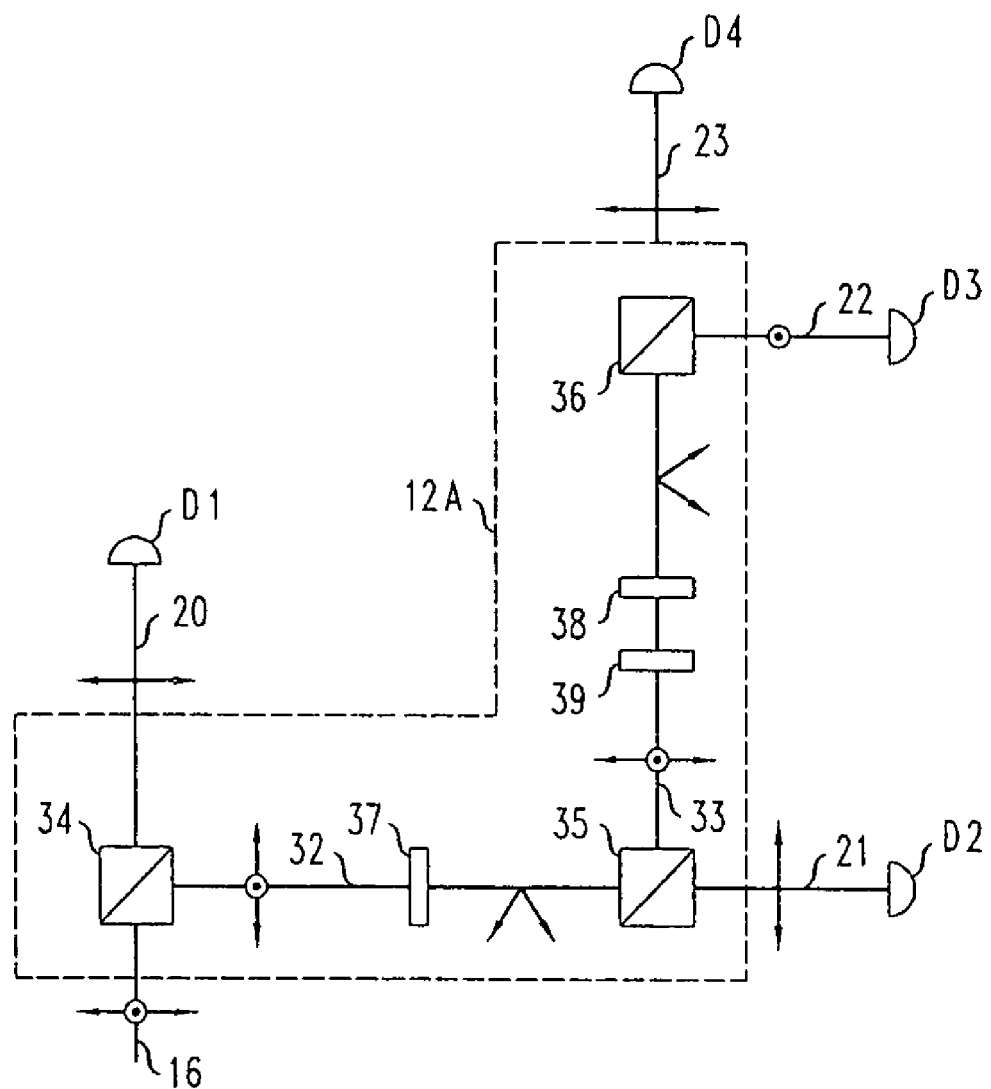
FIG. 3 shows an embodiment of the optical projector of FIG. 1 that includes two partial polarization splitters and one ordinary polarization splitter.
Figure 5:
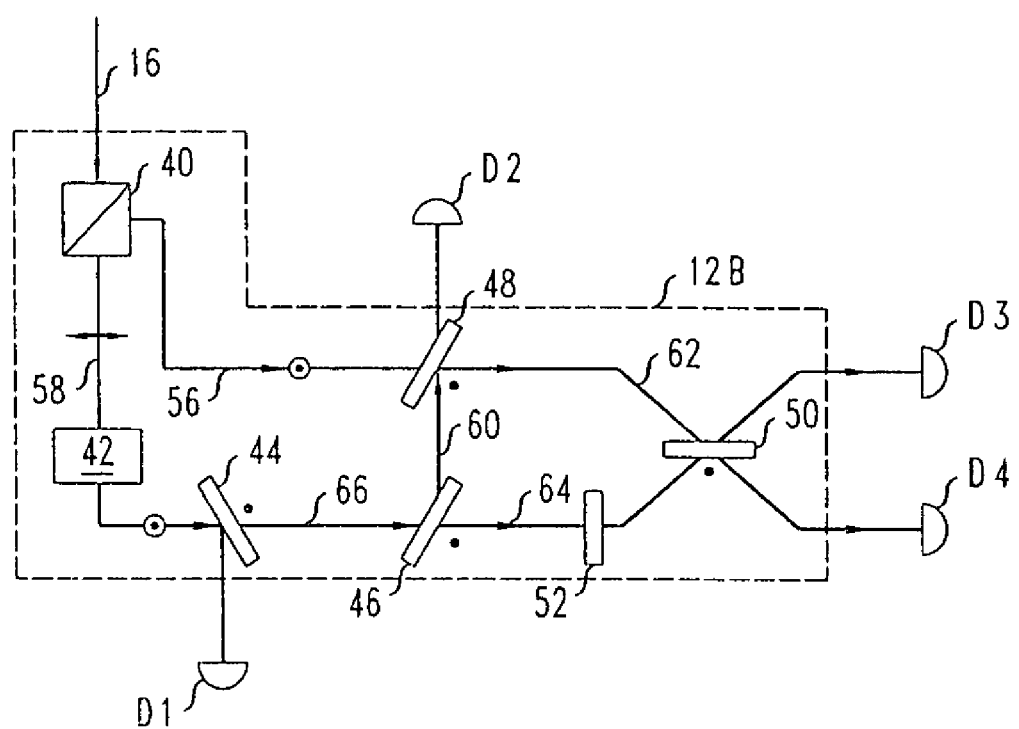
FIG. 5 shows another embodiment of the optical projector of FIG. 1 that includes multiple optical interferometers.

As measured by the mutual information, M, some optical detectors 10 with four optical detectors D1-D4 and an optical projector 12A, 12B of FIG. 3 or 5 may have information capacities as large as more complex conventional optical detectors.

In the various embodiments, optical projector 12 is configured to substantially simultaneously optically transmit projections of light received at optical input 16 to optical outputs 20, 21, 22, 23. These different optical projections are substantially simultaneous, because the optical projector 12 passively separates the received light from optical input 16 into multiple output beams that are directed to optical outputs 20-23. In the optical projector 12, the different optical projections, which are directed to optical outputs 20-23, are produced together and at nearly the same time. Time lags between the optical projections to different optical outputs 20-23 are related to differences in propagation times along the various optical paths between the optical input 16 and the various optical outputs 20-23. In contrast, some other types of optical analyzers perform optical projections of received light sequentially. These other optical analyzers dynamically reconfigure optical elements therein to produce the different optical projections. The passive separation of light performed in the optical projector 12 is more rapid than sequential analysis in which dynamical reconfigurations of optical elements are needed between measurements of the different optical projections.

Figure 2:
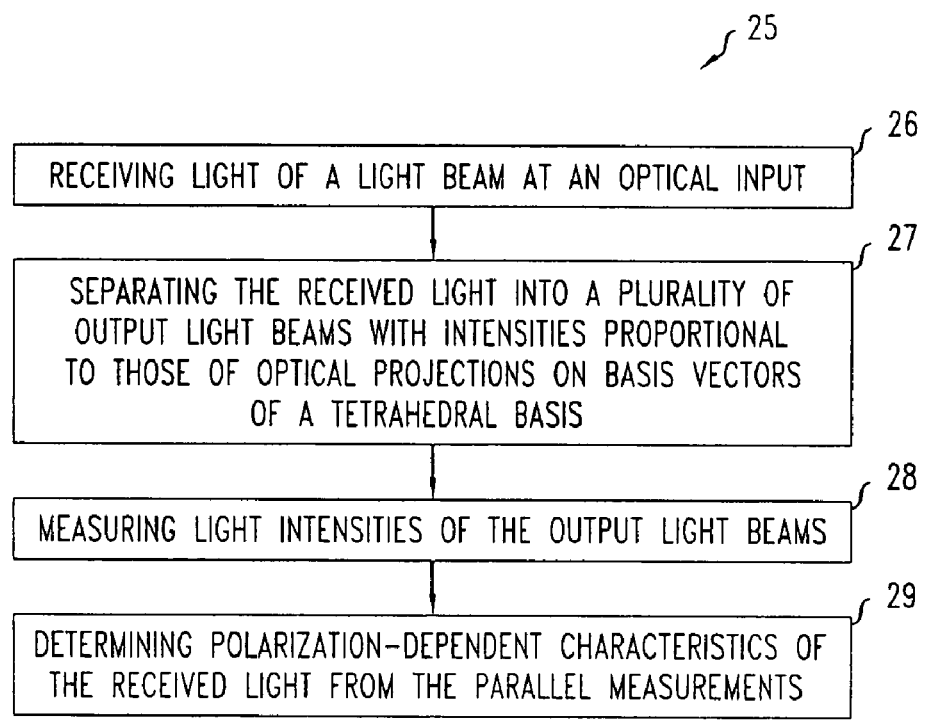
FIG. 2 is a flow chart illustrating a method for operating the optical detector of FIG. 1.

FIG. 2 illustrates a method 25 for operating optical detector 10 of FIG. 1. The method 25 includes receiving a light beam of a preselected wavelength at an optical input 16 (step 26). The method 25 includes operating an optical projector 12 to optically separate the received light beam of the preselected wavelength thereby substantially simultaneously producing a plurality of output light beams from the received light (step 27). The intensity of each output light beam is proportional to the intensity of one of the optical projections of the received light beam onto a basis vector of a tetrahedral basis set of a Stokes basis. Each output light beam is proportional to the optical projection onto a different one of the tetrahedral basis vectors of the set. The method 25 includes performing parallel measurements of the light intensities in the various output light beams and transmitting data representing the various measured light intensities in parallel to an electronic data processor 14 (step 28). The method 25 includes using the measured intensities of the output light beams to determine polarization-dependent characteristics of the light beam that was received at optical input 16 (step 29). Since the method 25 involves a parallel optical analysis of the light beam received at optical input 16, the method 25 is suitable for optical receivers (not shown) in which polarization-dependent information must be extracted from a light beam at high data rates.

FIGS. 3 and 5 show alternative embodiments 12A, 12B of optical projector 12 of FIG. 1. The optical projectors 12A and 12B are based, respectively, on partial polarization splitters and optical interferometers of polarized light.

FIG. 3 shows an exemplary optical projector 12A that is formed by a series of passive optical elements distributed along path segments 32, 33. The passive optical elements include partial polarization splitters 34, 35; ordinary polarization splitter 36; 45° polarization rotators 37, 38; and quarter wave plate 39.

Herein, both partial and ordinary polarization splitters have optical axes along which the parallel and orthogonal polarization components are separated and also have first and second optical outputs. Both types of polarization splitter transmit light of the polarization component, which is parallel to the splitter's optical axis, only to the first optical output. Typically, 90%, or more, preferably 95% or more, and more preferably transmitting 99% or more of this component's intensity is transmitted to the first optical output. The polarization splitters transmit all or a portion of the polarization component, which is oriented perpendicular to the splitter's optical axis, to the second optical output. Herein, a partial polarization splitter, e.g., splitters 34, 35, only partially separates light of the polarization component oriented perpendicular to the splitter's optical axis. In particular, a partial polarization splitter transmits a portion of the orthogonally oriented polarization component to each of its optical outputs. In contrast, herein, an ordinary polarization splitter, i.e., typically splitter 36, transmits light of the polarization component, which is orthogonal to the splitter's optical axis to only its second optical output. For example, greater than 90%, preferably greater than 95%, and more preferably 99% or more of the intensity of the orthogonal polarization component is transmitted to the second optical output.

Ordinary and partial polarization splitters are well known in the art. Ordinary polarization splitters are readily available commercially. Some partial polarization splitters are also commercially available. For example, partial polarization splitters having some splitting ratios for the perpendicular polarization component are available from CVI Laser, LLC, Corporate Headquarters, 200 Dorado Place SE, Albuquerque, N.Mex. 87123, USA (website: www.cvilaser.com). See e.g., CVI Laser's polarizing device and beam splitting cube products. Other partial polarization splitters can be fabricated as described in below FIGS. 4A-4B.

The optical projector 12A projects received light onto a tetrahedral basis set whose basis vectors are: $u_1=(1, 0)^t$, $u_2=(1, \sqrt{2})^t/\sqrt{3}$, and $u_3=(1, \sqrt{2}e^{i2\pi/3})^t/\sqrt{3}$, and $u_4=(1, \sqrt{2}e^{-i2\pi/3})^t/\sqrt{3}$. In the below description of how these optical projections are performed, the original light received at optical input 16 will be represented by complex 2-component vector S.

At optical input 16, partial polarization splitter 34 transmits ½±5% the intensity of the polarization component, which is oriented orthogonal to the splitter's optical axis, to light intensity detector D1, i.e., horizontal polarization component in FIG. 3. Thus, the light intensity detector D1 receives polarized light whose intensity is proportional to the projection of the light from the optical input 16 onto the first tetrahedral basis vector, i.e., an intensity of $|u_1^{554} \cdot S/\sqrt{2}|^2$. The partial polarization splitter 34 reflects the remainder of the light from the optical input 16 to path segment 32. This remainder includes ½±5% of the intensity of the polarization component, which is orthogonal to the splitter's optical axis, and the whole intensity of the polarization component, which is parallel to the splitter's optical axis, i.e., the vertical polarization component in FIG. 2.

Along path segment 32, light undergoes an effective rotation of its polarization by about 45°. The effective rotation causes a polarization component that is parallel to the optical axis of partial polarization splitter 34 to be rotated by about 45° with respect to the optical axis of partial polarization splitter 35. In some embodiments, the optical axes of polarization splitters 34, 35 are aligned, and a polarization rotator 37 produces the effective rotation of 45° on path segment 32. Due to this polarization rotation, the first and second partial polarization splitters 34, 35 separate orthogonal polarization components of the light along different Cartesian directions. Exemplary polarization rotators 37 use a pair of obliquely oriented mirrors, an optically active medium, or a suitably oriented ½ wavelength plate to produce the polarization rotation. In another embodiment, the optical axes of two partial polarization splitters 34, 35 are relatively rotated by 45. Due to the relative rotation, the partial polarization splitters 34, 35 separate orthogonal polarization components of light along different Cartesian directions.

Partial polarization splitter 35 partially separates polarization components of the light propagating on path segment 32. In particular, the partial polarization splitter 35 transmits about ⅔±5% the intensity of the polarization component orthogonal to its optical axis to light intensity detector D2. Thus, the light intensity detector D2 receives linearly polarized light whose intensity is proportional to a projection of light from optical input 16 onto the second tetrahedral basis vector, i.e., an intensity of $|u_2^{t} \cdot S/\sqrt{2}|^2$. The partial polarization splitter 35 reflects the remainder of the light from path segment 32 to path segment 33. This remainder includes about ⅓ the intensity of the polarization component, which is oriented orthogonal to the splitter's optical axis, and the whole intensity of the polarization component, which is oriented parallel to the splitter's optical axis, i.e., the vertical polarization component along path segment 33 in FIG. 3.

On path segment 33, the light reflected by partial polarization splitter 35 encounters quarter wave plate 39 and undergoes a second effective polarization rotation by about 45° in polarization rotator 38. The quarter wave plate 39 delays light polarized parallel to the optical axis of partial polarization splitter 35 by a phase of $\pm\pi/2+N\pi$ with respect to the orthogonal polarization component of said light. Here, "N" is any integer. Due, in part, to the quarter wave plate 39, the optical projector 12A projects light of the preselected wavelength along the remaining tetrahedral basis vectors. The polarization rotator 38 rotates the polarization of light propagating on path segment 33 by about ±45 degrees. Due to the polarization rotation and the relative phase shift, the partial polarization splitter 35 and ordinary polarization splitter 36 will separate the orthogonal polarizations of light along different directions. An exemplary polarization rotator 38 may include a pair of obliquely oriented mirrors, a volume of optically active material, or a suitably oriented, ½—wavelength plate.

In alternate embodiments (not shown), the effective polarization rotation by about 45° results from the optical axis of ordinary polarization splitter 36 having a relative rotation around path segment 33 of 45° with respect to the optical axis of partial polarization splitter 35. Due to the relative rotation of their optical axes, the partial and ordinary polarization splitters 35, 36 will again separate orthogonal polarizations of light along different directions.

After quarter wave plate 39 and polarization rotator 38, ordinary polarization splitter 36 separates polarization components of light from path segment 33. The ordinary polarization splitter 36 reflects the polarization component oriented parallel to its optical axis, i.e., vertically polarized light in FIG. 2, to light intensity detector D3 and transmits the component oriented orthogonal to its optical axis, i.e., horizontally polarized light in FIG. 2, to light intensity detector D4. For these reasons, light intensity detector D3 receives polarized light whose intensity is proportional to that of a projection of the light from optical input 16 onto the third tetrahedral basis vector, i.e., an intensity of $|u_3^{554} \cdot S/\sqrt{2}|^2$. Similarly, light intensity detector D4 receives polarized light whose intensity is proportional to that of a projection of the light from optical input 16 onto the fourth tetrahedral basis vector, i.e., an intensity of $|u_4^{554} \cdot S/\sqrt{2}|^2$.

In other embodiments, partial polarization splitters 34, 35 may transmit to their polarized optical outputs 20, 21 different percentages of light polarized orthogonal to their optical axes.

In some embodiments, front ends of optical paths 32, 33 also include structures (not shown) that compensate for polarization-dependent relative retardations in the partial polarization splitters 34, 35. The structures reduce such retardation effects so that light is linearly polarized rather than elliptically polarized at the front ends of said optical paths 32, 33. Such compensation structures may include a ¼—wave plate, a ½—wave plate, or a series of both.

Figure 4A:
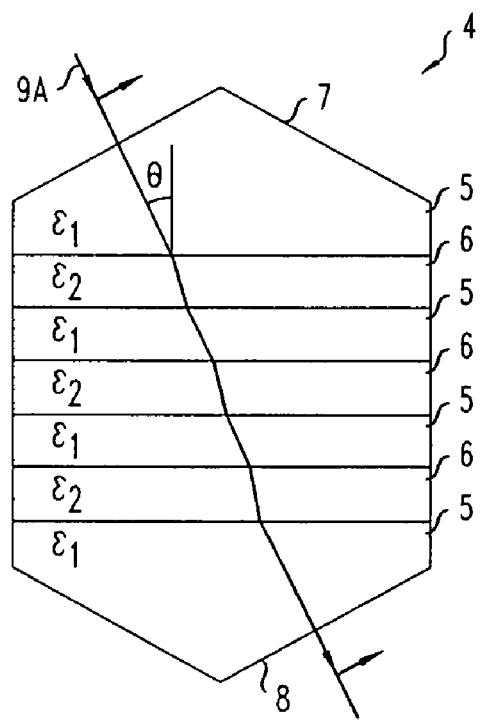
FIG. 4A shows how one type of partial polarization splitter processes light with a polarization in the incidence plane.
Figure 4B:
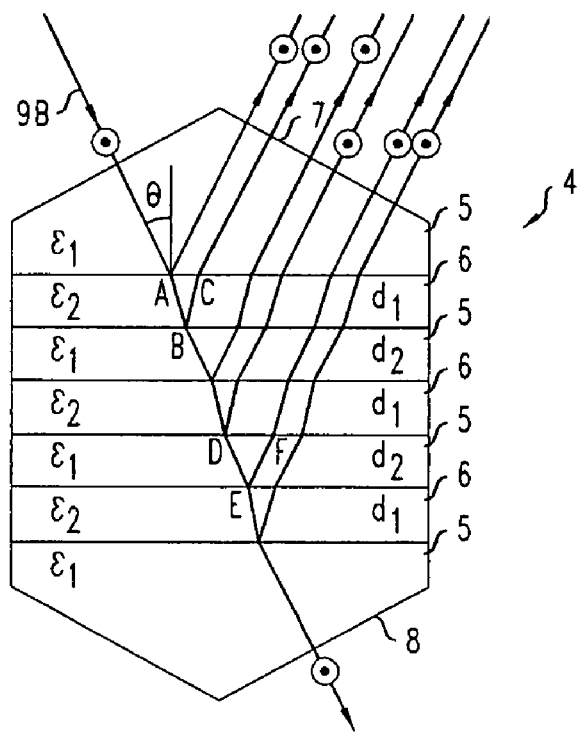
FIG. 4B shows how the partial polarization splitter of FIG. 4A processes light whose polarization is perpendicular to the incidence plane.

FIGS. 4A and 4B illustrate one structure 4 for a partial polarization splitter, e.g., for partial polarization splitters 34, 35 of FIG. 3. The structure 4 includes an alternating sequence of dielectric layers 5 with dielectric constant $\in_1$ and dielectric layers 6 with dielectric constant $\in_2$. Excepting the first and last layers 5, the layers 6, 5 of the stack have alternating thicknesses $d_1$ and $d_2$, respectively. Thus, the stack of layers 5, 6 forms a sequence of parallel interfaces where the dielectric constant has jumps. The number of layers 5, 6 determines the intensity splitting ratio of the structure 4. The structure 4 sends one polarization component to surface 7 and a mixture of polarization components to surface 8 provided that input light is incident on a first interface between the layers 5, 6 at the Brewster angle as described below.

Referring to FIG. 4A, a light beam 9A polarized in the incidence plane is incident on the first interface between layers 5, 6 at an angle, θ, where θ is the Brewster angle. Since the light beam 9A is incident at the Brewster, the interface transmits the light beam 9A without any reflection. Similarly, the light beam 9A is transmitted without any reflection by other interfaces of the stack. Thus, the structure 4 produces a single output light beam at surface 8 from the input light beam 9A.

Referring to FIG. 4B, a light beam 9B polarized perpendicular to the incidence plane also makes incidence angle, θ, at a first interface between layers 5, 6. Since the light beam 9B is not polarized in the incidence plane, the first interface reflects a portion of the light beam 9B and transmits the remainder. Similarly, the remaining light beam 9B is partially transmitted and partially reflected at each interface of the stack. The reflected portions interfere constructively if the layer thicknesses $d_1$ and $d_2$ are selected appropriately. Thus, the light beam 9B is partially transmitted to output surface 8 and is partially reflected to output surface 7.

FIG. 5 shows alternate optical projector 12B, which includes ordinary polarization splitter 40, 90° polarization rotator 42; partially reflecting mirrors 44, 46, 48, 50, e.g., partially silvered mirrors; and quarter wave plate 52. An exemplary 90° polarization rotator 42 is a half-wave plate whose optical axis is rotated by 45° with respect to the polarization of the light transmitted to path segment 58 by the ordinary polarization splitter 40.

Optical projector 12B interferes 16 in first and second optical interferometers the orthogonal polarization components of light, which has a preselected wavelength and is received at optical input. The first optical interferometer includes partially reflecting mirrors 44, 46, 48; 90° polarization rotator 42. The first optical interferometer also includes path segments 56, 58, 66, 60, which couple the passive optical elements to each other and to polarization splitter 40. The second optical interferometer includes the partially reflecting mirrors 44, 46, 48, 50; 90° polarization rotator 42; and quarter wave plate 52. The second optical interferometer also includes path segments 56, 58, 66, 60, 62, 64, which couple the passive optical elements to each other and to the polarization splitter 40. The second interferometer produces two separate interference patterns, which are directed towards optical intensity detector D3 and optical intensity detector D4, respectively. In the two patterns, the light of the two arms 62, 64 is added with different relative phases.

In the optical projector 12B, light is received at optical input 16, and ordinary polarization splitter 40 separates the received light into orthogonal polarization components. Below, the received light from optical input 16 is represented by complex two-component vector S. The polarization splitter 40 reflects the vertically polarized component of the received light to path segment 56 and transmits the horizontally polarized component of the received light to separate path segment 58. The vertically and horizontally polarized components are mutually coherent and have well-defined relative phases. The path segment 58 includes a 90° polarization rotator 42 that rotates the polarization of light therein to be parallel to the polarization of light received in path segment 56. The rotation produces approximately parallel polarizations so that the light of the originally orthogonal polarization components from ordinary polarization splitter 40 can interfere in the two optical interferometers of the optical projector 12B.

On path segment 58, partially reflecting mirror 44 reflects ½ of the light intensity therein to light intensity detector D1 and transmits the remaining ½ of the light intensity to path segment 66. The light intensity detector D1 receives polarized light whose intensity is proportional to that of a projection of the light from optical input 16 onto a first tetrahedral basis vector of a Stokes basis, i.e., an intensity of $|u_1^{554} \cdot S/\sqrt{2}|^2$.

At the end of path segment 66, partially reflecting mirror 46 reflects ½ of the light intensity from path segment 66 to path segment 60 and transmits the remaining ½ of the light intensity to path segment 64. The reflected light does not undergo a phase shift at partially reflecting mirror 46. The transmitted light undergoes a phase shift of π/2 in quarter wave plate 52 of the path segment 64.

Partially reflecting mirror 48 interferes polarized light reflected from path segment 56 with polarized light transmitted from path segment 60. In particular, the partially reflecting mirror 48 reflects ⅓ of the light intensity from the path segment 56 to light intensity detector D2 and transmits the remaining ⅔ of this light intensity to path segment 62. The partially reflecting mirror 48 also transmits ⅔ of the light intensity from the path segment 60 to the light intensity detector D2 and reflects the remaining ⅓ of this light intensity to path segment 62. The reflection of light from path segment 56 is without a phase shift, and the reflection of light from path segment 60 is with a phase shift of π.

Partially reflecting mirror 48 generates the optical interference for the first optical interferometer of optical projector 12B. Between the partially reflecting mirror 48 and ordinary polarization splitter 40, the two different optical paths are configured to have equal total optical lengths at a preselected wavelength up to an integer number of wavelengths. The equality of the two optical path lengths ensures that light of the two originally orthogonal polarization components from optical input 16 will undergo in-phase interference. Preferably, the different optical paths, which are traversed by the light of the two orthogonal polarization components, have equal optical path lengths for light having the preselected wavelength. For in-phase interference conditions, light intensity detector D2 receives linearly polarized light whose intensity is proportional to a projection of light from optical input 16 onto the second tetrahedral basis vector, i.e., an intensity of $|u_2^{554} \cdot S/\sqrt{2}|^2$.

Partially reflecting mirror 50 generates the optical interference for the second optical interferometer of optical projector 12B by coherently combining polarized light from path segment 62 and path segment 64. The partially reflecting mirror 50 produces separate interference patterns in light intensity detectors D3 and D4. In particular, the partially reflecting mirror 50 reflects about ½ of the light intensity from the path segment 62 into the light intensity detector D3 and transmits the remaining ½ of the light intensity to the light intensity detector D4. Similarly, the same partially reflecting mirror 50 reflects about ½ of the light intensity from path segment 64 to the light intensity detector D4 and transmits the remaining ½ of the light intensity from the path segment 64 to the light intensity detector D3. The partially reflecting mirror 50 reflects light from the path segment 62 without a phase shift and reflects the light from the path segment 64 with a $\pi$ phase shift.

Between partially reflecting mirror 50 and polarization splitter 40, the various optical paths also satisfy a condition relating total optical path lengths. This condition relates the total optical path length for the paths including segment 62 to the total optical length of the path including segment 64. The optical paths including segment 62 and the optical paths including 64 are designed to have optical path lengths that differ such that the polarized light received in light intensity detector D3 has an intensity proportional to that of a projection of light from optical input 16 onto the third tetrahedral basis vector, i.e., an intensity of $|u_3^\dagger \cdot S/\sqrt{2}|^2$. Also, the polarized light intensity received in light intensity detector D4 has an intensity proportional to that of a projection of the light from optical input 16 onto the fourth tetrahedral basis vector, i.e., an intensity of $|u_4^\dagger \cdot S/\sqrt{2}|^2$.

In optical projector 12B, the first and second interferometers are configured to interfere light of the two originally orthogonal polarization components from ordinary polarization splitter 40 with different relative phases. In optical intensity detector D2, the first interferometer interferes light of these two polarization components with a relative phase shift whose magnitude is less than 10 degrees, is preferably less than 5 degrees, and is more preferably less than 1 degree. In optical intensity detectors D3 and D4, the second interferometer interferes the light of the same two original polarization components with relative phase shifts whose magnitudes are 120±10 degrees, are preferably 120 ±5 degrees, and are more preferably 120±1 degrees. The above cited relative phases are up to integer multiples of 360 degrees.

Other embodiments of the invention will be apparent to those skilled in the art in light of the specification, drawings, and claims of this application.

What is claimed is:

1. An apparatus, comprising:
   a polarization splitter to separate light into a first polarization component and a second orthogonal polarization component;
   a first optical interferometer coupled to receive light of the first and second polarization components from the splitter at separate optical inputs and configured to interfere part of the light of the first polarization component with part of the light of the second polarization component; and
   a second optical interferometer coupled to receive light of the first and second polarization components from the splitter at separate optical inputs and configured to interfere a portion of the light of the first polarization component with a portion of the light of the second polarization component; and
   wherein the second optical interferometer is configured to produce a different relative phase between interfering light of the two polarization components than the first optical interferometer, the second interferometer being configured to interfere portions of the light of the two polarization components with a relative phase shift whose magnitude is 120 degrees ±10 degrees.

2. The apparatus of claim 1, wherein the first interferometer is configured to interfere parts of the light of the two polarization components with a second relative phase shift whose magnitude is less than 10 degrees.

3. The apparatus of claim 1, wherein the interferometers are configured to rotate a polarization of part of the light received from the splitter to produce optical interference between the light of the first and second polarization components.

4. The apparatus of claim 3, wherein the first interferometer is configured to interfere parts of the light of the two polarization components with a second relative phase shift whose magnitude is less than 10 degrees.

5. The apparatus of claim 1, further comprising:
   a first light intensity detector located to measure a light intensity of one of the first polarization component and the second polarization component;
   a second light intensity detector located to measure an intensity of light interfered in the first interferometer; and
   a third light intensity detector located to measure an intensity of light interfered in the second interferometer.

6. The apparatus of claim 5, further comprising:
   a fourth light intensity detector located to measure another intensity of light interfered in the second interferometer, the third and fourth detectors being configured to measure intensities of light associated with projections on independent basis vectors of a tetrahedral basis set.

* * * * *